US010620854B1

(12) United States Patent
James et al.

(10) Patent No.: US 10,620,854 B1
(45) Date of Patent: Apr. 14, 2020

(54) VALIDATING DATA FOR DEPLOYMENT

(71) Applicant: Amazon Technologies, Inc., Seattle, WA (US)

(72) Inventors: Michael Curtis James, Secaucus, NJ (US); Daniel Rohr, New York, NY (US); Patrick Nevels, Brooklyn, NY (US); Amol Godbole, Easton, CT (US); Prakash Krishnan, Oakland, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/204,966

(22) Filed: Nov. 29, 2018

(51) Int. Cl.
 *G06F 12/00* (2006.01)
 *G06F 3/06* (2006.01)

(52) U.S. Cl.
 CPC ............ *G06F 3/0619* (2013.01); *G06F 3/064* (2013.01); *G06F 3/067* (2013.01)

(58) Field of Classification Search
 None
 See application file for complete search history.

(56) References Cited

U.S. PATENT DOCUMENTS

| 7,761,410 B2 * | 7/2010 | Hunt | G06F 19/328 |
| | | | 707/609 |
| 10,055,444 B2 * | 8/2018 | Arora | G06F 16/2365 |
| 2002/0198899 A1 * | 12/2002 | Yamaguchi | G06F 16/27 |

* cited by examiner

*Primary Examiner* — John A Lane
(74) *Attorney, Agent, or Firm* — Thorpe North & Western, LLP.

(57) ABSTRACT

A technology is described for deploying datasets to a production data store. An example of the technology may include receiving a request at a data deployment service to submit a dataset to a production data store which is accessible to services that utilize datasets stored in the production data store. A temporary dataset may be created in a preproduction staging store and a first consistency check may be performed against the temporary dataset to determine whether the temporary dataset complies with dataset specifications. The temporary dataset may be included in a batch of temporary datasets cached on the preproduction staging store when the first consistency check is successful, and a second consistency check may be performed against the batch to determine whether the at least one temporary dataset complies with the dataset specifications. The temporary datasets may be stored to the production data store when the second consistency check is successful.

20 Claims, 9 Drawing Sheets

VALIDATING DATA FOR DEPLOYMENT

BACKGROUND

In the context of data stores, consistency refers to the concept that data written to a data store should comply with defined rules for valid data. A defined rule for data may specify allowed ways that a data transaction may affect data stored in a data store or database. If a data transaction attempts to introduce inconsistent data by violating a defined rule, the data transaction may be rolled back, blocked, or aborted, and an error may be returned to a user. As an example, a data consistency check may include a consistency rule specifying that a day of the week column contain non-abbreviated values. If a data transaction attempts to write an abbreviated value to the column (e.g., "Tues"), then the data consistency check may cause the data transaction to be rejected.

The advent of centralized computing service architectures has opened new possibilities for managed data store services. In general, a centralized computing service architecture may deploy a set of hosted resources such as processors, operating systems, software and other components that can be combined together to form virtual resources. These virtual resources may be used to provide various managed data store services, such as relational and nonrelational data stores. A customer can deploy a data store in a service provider environment, and a managed data store service may automatically scale throughput capacity to meet workload demands. Also, the data store service may manage aspects of the data store that include partitioning and repartitioning customer data as data store tables grow, synchronously replicating data across data centers, as well as providing built-in security, backup and restore functionality, and in-memory caching.

DETAILED DESCRIPTION

Figure 1:
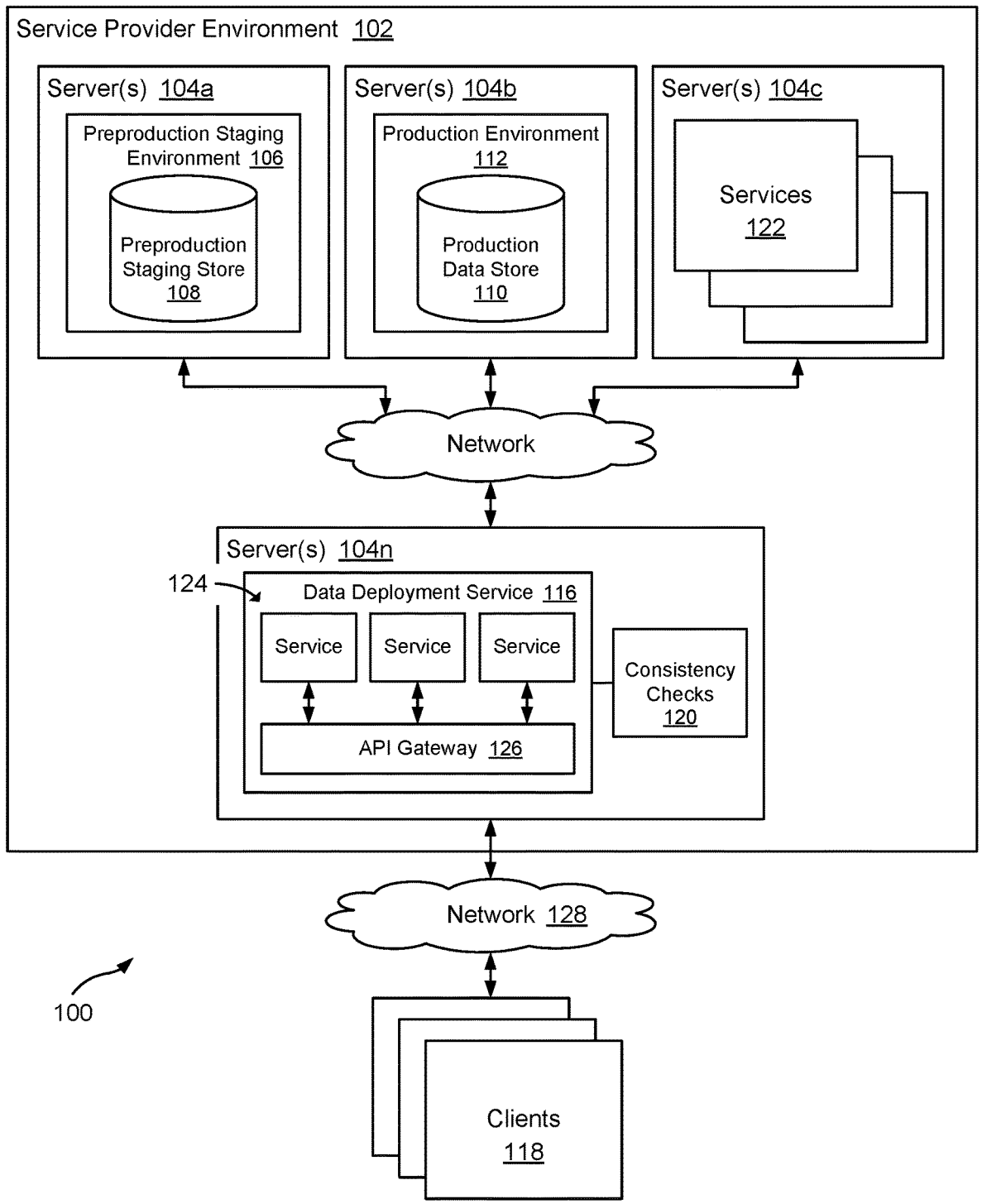
FIG. 1 is a block diagram illustrating an example system for validating data in a preproduction environment prior to storing the data to a production environment.

A technology is described for validating a dataset in a preproduction environment prior to promoting the dataset to a production environment. The technology may include a two-step process used to validate datasets using consistency checks prior to submitting the datasets to a production data store. The first step of the two-step data validation process creates a temporary dataset in a preproduction environment and executes a consistency check against the temporary dataset. If validated, the temporary dataset may be cached with other temporary datasets that have been validated and are cached for promotion to one or more production data stores. The second step of the two-step data validation process may execute a second consistency check against the cached temporary datasets, and if validated by the second consistency check, the datasets included in the cached temporary datasets may be promoted to the production data store.

Consistency checks (e.g., a set of data validation rules) used to validate datasets may comprise any validation logic which can be encoded and systematically invoked to enforce defined quality measures for a broad data set. A consistency check may include data validation rules used to analyze a dataset for: fitness, accuracy, and/or consistency. In one example, users (e.g., system and service administrators) may be provided with the ability to define consistency checks and have the consistency checks applied to datasets that are going to be submitted to a production data store for storage. For example, a data deployment check service may provide users with a user interface to define or upload a consistency check and to apply the consistency check to specified datasets. In one example, consistency checks may be constructed to validate datasets based on the specifications of a particular service that utilizes the dataset. As a non-limiting example, a consistency check may be defined based on the specifications of a web service that uses metadata retrieved from a production metadata store to construct a product page for an electronic retailer. Illustratively, the consistency check may include unit tests to validate string lengths, include validation logic to test consistency across multiple product pages, as well as validation logic that parses the metadata to confirm that the web service is able to use the metadata. Consistency checks may include as many distinct validation rules as desired, and may be as long-running as may be needed to perform the validation rules, wherein throughput of datasets may be primarily bounded by the runtime of the consistency checks.

In one example of the technology, a data deployment service may provide data validation services used to validate data submitted to a production data store for storage. The data deployment service may be configured to execute the two-step data validation process above. As an example, the data deployment service may receive requests to store datasets, or modifications to datasets, to a production data store. Illustratively, the production data store may store datasets used by a service. For example, a catalog service may obtain metadata for an item from the production data store and include the metadata in an electronic catalog of items. In response to a request to store a dataset to the production data store, the data deployment service may generate a temporary dataset in a preproduction staging store. The data deployment service may be configured to perform a first consistency check against the temporary dataset to determine whether the dataset complies with dataset specifications designed to detect noncompliant data. The first consistency check may be performed to prevent any single user from making an invalid change to production data that negatively impact others. The first consistency check can be performed in parallel with a number of submitted datasets and feedback for the first consistency check may be timely provided to a user, allowing the user, if needed, to correct any errors discovered in a dataset and resubmit the dataset. As such, the first consistency check may be considered a preliminary check used to capture errors in individual datasets prior to performing a second consistency check used to determine data consistency between datasets contained in a batch of datasets. In the case where the first consistency check is successful, the temporary dataset may be included in a batch of temporary datasets cached on the preproduction staging store. The batch of temporary datasets may include datasets which have been validated and are cached on the preproduction staging store awaiting promotion to one or more production data stores. In the case where the first consistency check is unsuccessful, a user may be notified, and the user may either modify the temporary dataset, or the user may abandon the temporary dataset and the temporary dataset may be deleted from the preproduction staging store.

The data deployment service may be configured to perform a second consistency check against the datasets included in the batch of temporary datasets to determine whether the datasets continue to comply with the dataset specifications. For example, the second consistency check may be performed to ensure that a dataset in the batch of temporary datasets, when combined with other dataset submissions from other users, systems, and/or data providers included in the batch, do not introduce errors that cause the dataset modifications to violate the dataset specifications. In the case that the second consistency check is successful, the datasets included in the batch of temporary datasets may be stored to the production data store and the temporary datasets may be deleted from the preproduction staging store. In the case that the second consistency check is unsuccessful, the batch of temporary datasets may be blocked and a user (or a number of users) may be notified that corrective action is needed to unblock the batch of temporary datasets.

In the past, consistency checks have been executed against production data already stored in a production data store. The consistency checks were used to validate that the production data complied with specifications of services that utilize the production data. As a result of storing data to a production data store and then executing consistency checks against the production data, a noncompliant dataset (e.g., improperly formatted data, incorrect data, inconsistent data, etc.) could be introduced into the production data store, making the noncompliant dataset available to services, which could cause a service, or a service function, to fail.

The present technology provides benefits associated with validating datasets for use by services prior to promoting the datasets to a production environment. One such benefit may be that noncompliant datasets may be detected, and the noncompliant datasets may be prevented from being stored to a production data store. Validating datasets prior to storing the datasets to a production data store has been a challenge. For example, having a large number of users submitting changes to a production data store can quickly result in errors or inconsistencies. The present technology overcomes these problems. In particular, as described herein, a preproduction staging store may be used to host temporary datasets and a data deployment service may be used to validate the temporary dataset using one or more consistency checks that include checking service specifications (e.g., checking a data format or data type that is compatible with service operations) for services that utilize the dataset. The data deployment service may be scaled to handle any number of users, allowing for dataset validation to be performed in parallel, and to batch and sequence datasets in an order that minimizes the introduction of data errors into a production environment while maximizing throughput of submitted datasets to the production environment. For example, performing a first consistency check against individual temporary datasets in parallel may prevent errors from reaching a batch, and thus impacting other datasets. Detecting errors in individual temporary datasets using a first consistency check may increase throughput by catching the errors earlier in the process, so that the errors do not slow throughput later when performing the second consistency check. For example, a user may be notified of any errors in their dataset, allowing the user to resolve the errors in the dataset prior to promoting the dataset to a batch of datasets and performing the second consistency check upon the batch, thereby preventing the errors in the dataset from slowing throughput of datasets to production. Consequently, the present technology provides improvements to promoting datasets to a production environment by using a preproduction staging environment to perform consistency checks and resolve data errors prior to storing data to a production environment.

To further describe the present technology, examples are now provided with reference to the figures. FIG. 1 is a diagram illustrating a high-level example of a system 100 in accordance with one example of the technology. The system 100 may include a plurality of servers 104a-n located in a service provider environment 102 (e.g., a "cloud" environment) that provides computing services to customers. The service provider environment 102 may comprise a data center or multiple data centers located in various geographic regions which may be in network communication. The servers 104a-n may host various components of the system 100. As illustrated, one or more servers 104a may host a preproduction staging environment 106, one or more servers 104b may host a production environment 112, one or more servers 104c may host services 122 configured to utilize data obtained from the production environment 112, and one or more servers 104n may host a data deployment service 116 configured to validate datasets submitted for use in the production environment 112. As will be appreciated, the system 100 may include additional components not specifically described herein.

The data deployment service 116 may provide automated processes to validate, stage, and promote datasets to the production environment 112 where the datasets may be used by one or more services 122, processes, users, or other entities. In one example, the data deployment service 116 may be a supplemental service of a data store service (e.g., a managed data store service "cloud service" provided by a service provider) that manages one or more production data stores 110. As described in more detail later in relation to FIGS. 2-4, the data deployment service 116 may be configured to stage a dataset in the preproduction staging environment 106 and execute a consistency check 120 against the dataset to determine whether the dataset complies with dataset specifications designed to prevent storing of noncompliant data to the production environment 112. The validated dataset may be included in a batch of datasets that have been validated and are cached for promotion to the production environment 112. The data deployment service 116 may execute one or more additional consistency checks 120 against the batch of datasets, and if successful, the datasets may be promoted to the production environment 112.

The data deployment service 116 may be configured to receive datasets and dataset modifications which have been submitted for inclusion in the production environment 112 and perform consistency checks 120 against the datasets to determine whether the datasets can be promoted to the production environment 112. A consistency check 120 may include dataset specifications that define valid data. The dataset specifications may provide certain well-defined rules for fitness, accuracy, and/or consistency used to determine whether a dataset is eligible for inclusion in the production environment 112. The consistency checks 120 may be defined and designed using any of various methodologies and contexts. For example, a consistency check 120 may be defined from the context of a service 122 that uses the data, or from the context of a user who uses the data. Users, such as system and service administrators, may create consistency checks 120 and provide the consistency checks 120 to the data deployment service 116 for use in validating datasets associated with the consistency checks 120. For example, a service administrator of a service 122 may build a consistency check 120 that includes validation rules based at least in part on the data constraints of the service 122 (e.g., data format, data type, etc.), and the consistency check 120 may be registered with the data deployment service 116 and used to validate datasets used by the service 122.

The consistency checks 120 may be implemented using computer instructions (e.g., a computer programming language) that define logic for a set of validation rules that are executed by the data deployment service 116. The consistency checks 120 may include various types of data validations defined according to the scope, complexity, and purpose of the data validation operations to be performed. Examples of types of data validations used in the consistency checks 120 may include, but are not limited to, the following data validation types: range and constraint validation, data-type validation, code and cross-reference validation, and structured validation. Range and constraint validation may include examining datasets for consistency with a minimum/maximum range, or consistency with a test for evaluating a sequence of characters, such as one or more tests against regular expressions. Data-type validation may include verification that individual characters included in a dataset are consistent with the expected characters of one or more known primitive data types. Code and cross-reference validation may include testing for data type validation, combined with one or more operations to verify that a dataset is consistent with one or more external rules, requirements, or validity constraints relevant to a particular organization, context, or set of underlying assumptions may be performed. Structured validation allows for the combination of any of various basic data type validation steps, along with more complex processing. Moreover, a consistency check may be configured to perform longer-running processes, like scanning a large database table or searching for, and cross-comparing, elements of one or more tables for consistency.

In one example, the data deployment service 116 may comprise a plurality of independently deployable services 124 that execute on the computing resources included in the service provider environment 102. In one example, the independently deployable services 124 may be federated services or micro-services. A federated service may be an autonomous service interconnected via a computer network to other autonomous services by way of one or more network gateways or network connections. A micro-service may be a narrowly focused independently deployable service configured to execute a single task in response to a service request (e.g., an API request). The independently deployable services 124 may be configured to execute a workflow for validating data submitted for inclusion in the production environment 112, where individual services 124 perform a task or step of the workflow. For example, the independently deployable services 124 may act as linked functions in the workflow where the output of one service 124 is provided as input to the next service 124. The independently deployable services 124 may be scaled by adding or removing computing resources used to execute the services 124 in response to user demand. An API gateway 126 may enable communication among the independently deployable services 124 allowing the services 124 to receive input and send output via API requests, providing a communication "backbone" to the services 124. The API gateway 126 may be a managed service provided by a service provider. The API gateway 126 may be scaled by adding or removing computing resources used by the API gateway 126 based on an amount of API traffic generated by the independently deployable services 124.

The data deployment service 116 may be "serverless", in that components of the data deployment service 116 (e.g., the independently deployable services 124) may be executed in response to events, and the underlying compute resources used to execute the components of the data deployment service 116 may be automatically managed. For example, an independently deployable service 124 (e.g., a micro-service) may be implemented using a program code function, which may comprise a "serverless" function. For example, a program code function may be a segment of program code that may be like a function, and the program code function may receive parameters, perform processing, make service requests, and provide return values. In one example, a software container may be used to provide an isolated environment for a program code function to execute. The software container may contain the program code function (e.g., JAVA code, C # code, etc.) and any dependencies (e.g., library files) used to execute the program code function on a computing resource. For example, operating system kernel functionality may be used to isolate computing resources and create separate namespaces in order to provide an isolated (containerized) user space for a program code function to execute. In doing so, the program code function may be contained to the isolated user space, allowing multiple containerized program code functions to utilize a single operating system kernel. Also, a runtime service may be loaded into the software container, and the runtime service may manage execution of the program code function and provide an interface between the operating system for the computing resource and the program code function executing inside of the software container. A function service (not shown) may manage execution of program code functions by allocating computing resources for executing a program code function in response to execution requests, launching the program code function, and deallocating the computing resources utilized by the program code function.

While FIG. 1 depicts three independently deployable services 124, it will be appreciated that any number of independently deployable services 124 may be used to implement the data deployment service 116. As will be appreciated, the data deployment service 116 is not limited to the example implementation illustrated in FIG. 1. The data deployment service 116 may be implemented using any configuration of modules (software and/or hardware), functions, routines, and the like.

The preproduction staging environment 106 may include one or more preproduction staging stores 108 managed using a data store service (e.g., a managed service provided by a service provider, such as a "cloud" provider). The preproduction staging environment 106 may provide staging storage for datasets that have been submitted to the data deployment service 116 with a request to add the dataset to the production environment 112 or a request to modify an existing dataset in the production environment 112. Datasets submitted to the data deployment service 116 may be cached on a preproduction staging store 108 included in the preproduction staging environment 106. For example, users, by way of clients 118, may submit a dataset or a dataset modification to the data deployment service 116 via a user interface (shown in FIG. 2) provided by the data deployment service 116, and in response, the data deployment service 116 may cause a temporary dataset containing the dataset or dataset modification to be created and stored in the preproduction staging store 108.

In one example, the preproduction staging store 108 may include a copy of production data stored on a production data store 110 included in the production environment 112. In response to receiving a dataset modification, a temporary dataset may be created on the preproduction staging store 108 to include a corresponding production dataset copy stored on the preproduction staging store 108 and the dataset modification may be written to the temporary dataset. A validated temporary dataset or dataset modification cached on the preproduction staging store 108 may be promoted (i.e., written and stored) to the production data store 110 and a copy of the validated temporary dataset or dataset modification may be stored on the preproduction staging store 108. Temporary datasets and dataset modifications determined to be invalid or noncompliant may not be promoted to the production data store 110 and may be deleted from the preproduction staging store 108.

As indicated above, the production environment 112 may include a production data store 110 containing production data that may be accessible to services 122 configured to utilize datasets stored in the production data store 110. The production data stored in the production data store 110 may include any type of data, including metadata and data objects. The services 122 configured to utilize the production data may include any service configured to obtain a dataset from the production environment 112 and use the dataset in the service's operations. Illustratively, the services 122 may include, but are not limited to: web services, compute services, system admin services, machine learning services, media services, business productivity services, gaming services, electronic retail operations, or any other type of service configured to utilize datasets obtained from the production environment 112. As a non-limiting example, a catalog service may obtain metadata for an item included in a catalog from the production environment 112 and include the metadata in an electronic catalog of items. As another non-limiting example, a classification service may use datasets obtained from the production environment 112 to classify items associated with the datasets based on the content of the datasets.

In one example, the preproduction staging environment 106 and the production environment 112 may be managed environments provided by a service provider. A data service may be used to manage the preproduction staging store 108 and/or the production data store 110 making data stored in the preproduction staging environment 106 and/or the production environment 112 accessible to the services 116 and 122. Illustratively, a data service may include, but is not limited to: an object storage service that provides object storage through API interfaces, a NoSQL database service that supports key-value and/or document data structures, a managed data warehouse service, a distributed relational database service, a managed graph database, as well as other types of data services. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The service provider environment 102 may include computing resources for executing computing instances (e.g., virtual machines), which may be an instance of a software implementation of a machine (i.e. a computer) configured to emulate a physical machine. Various components of the system 100 may be hosted on one or more computing instances. A service provider environment 102, which may be used to implement the system 100, is described in greater detail later in association with FIG. 8. The various processes and/or other functionality contained within the system 100 may be executed on one or more processors that are in communication with one or more memory modules. The system 100 may include a number of computing devices that are arranged, for example, in one or more server banks or computer banks or other arrangements. The computing devices may support a computing environment using hypervisors, virtual machine monitors (VMMs) and other virtualization software.

API calls, procedure calls or other network commands that may be made in relation to the modules and services included in the service provider environment 102 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A user may utilize a client 118 to submit datasets and dataset modifications. A client 118 may include a client device, which may be any device capable of sending and receiving data over a network 128. For example, the client device may be a processor-based computing device. A client device may be a device such as, but not limited to, a desktop computer, laptop or notebook computer, tablet computer, mobile computing device, mainframe computer system, handheld computer, workstation, network computer, or other computing devices with like capability.

The network 128 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 1 illustrates that certain services may be discussed in connection with this technology. These services may be implemented using processing modules. In one example configuration, a processing module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with a module and make requests and receive output from the modules. While FIG. 1 illustrates an example of a system that may implement the techniques above, many other similar or different environments are possible. The example environments discussed and illustrated above are merely representative and not limiting.

Figure 2:
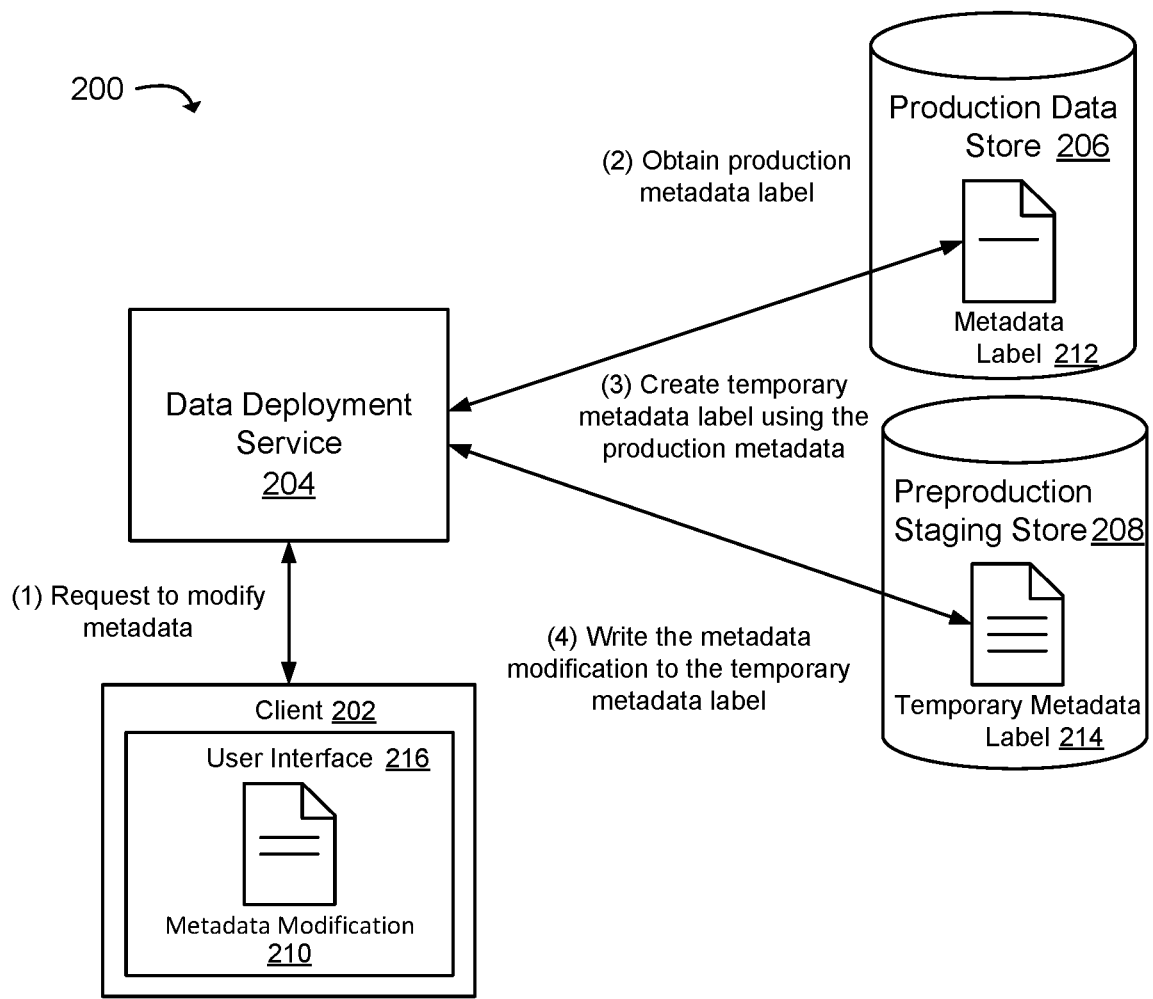
FIG. 2 is a diagram that illustrates an example system and method for handling a request to submit a metadata modification to a production data store.

FIG. 2 is a diagram illustrating an example system 200 and method for handling a request to modify metadata stored in a production data store 206. The system 200 may include a data deployment service 204 configured to validate a user submitted metadata modification staged on a preproduction staging store 208 and deploy the validated metadata modification to a production data store 206. A metadata label 212 stored in the production data store 206 may be associated with an item. The item may be a physical or virtual item. As a non-limiting example, an item may be a product or service, and a metadata label 212 describing the product or service may be stored to the production data store 206 for use by various services (e.g., accounting services, inventory services, web services, etc.).

The system 200 may also include a client 202 used to submit requests to modify metadata to the data deployment service 204. A user may be provided with a user interface 216 that allows the user to provide one or more metadata modifications 210 (e.g., a spreadsheet of metadata modifications or a single metadata entry) to the data deployment service 204, and/or enter one or more metadata modifications 210 into input controls (e.g., a text box or fields) included in the user interface 216. In one example, an input control included in the user interface 216 may be populated with a metadata label 212 retrieved from the production data store 206 and a user may directly modify the metadata label 212 in the input control and submit the metadata modification 210 to the data deployment service 204 for validation prior to storing the metadata modification 210 to the production data store 206.

Also, the user interface 216 may be used to correct errors that prevent a metadata modification 210 from being validated and stored to the production data store 206. For example, in the event that a consistency check executed against a metadata modification 210 is unsuccessful, a user may be notified, and the user, via the user interface, may correct an error contained in the metadata and resubmit the metadata modification 210 to be re-validated and promoted to the production data store 206.

In response to receiving a request to modify metadata, the data deployment service 204 may be configured to generate a temporary metadata label 214 to contain metadata associated with the request. A temporary metadata label 214 may comprise a data structure that includes one or more metadata fields containing metadata. As a non-limiting example, a temporary metadata label 214 may include an item name field, an item description field, and an item price field. In one example, a metadata label 212 may be obtained from the production data store 206 and the metadata label 212 may be written to the temporary metadata label 214. In another example, the preproduction staging store 208 may contain a copy of the metadata label 212 stored on the production data store 206 and a temporary metadata label 214 may be generated to include the copy of the metadata label 212.

In one example, the data deployment service 204 may be configured to determine whether a request to modify metadata conflicts with an earlier submitted request. When the request does conflict with an earlier request, the request may be rejected. A user may be notified, and the request can be modified and resubmitted or deleted. As an example, in response to receiving a metadata modification request, the data deployment service 204 may query the preproduction staging store 208 to determine whether any temporary metadata labels 214 cached on the preproduction staging store 208 include metadata modifications that conflict with the requested metadata modification. Illustratively, a conflicting modification may include an earlier request to modify a product description to a first value and a later request in the same preproduction batch to modify the same product description to a second value. Another conflicting modification may be a first request that deletes a foreign key dependency between two dataset tables and a second request that references the foreign key dependency.

After generating the temporary metadata label 214, the data deployment service 204 may write the metadata modification 210 to the temporary metadata label 214. Writing the metadata modification 210 to the temporary metadata label 214 may result in: overwriting metadata already contained in the temporary metadata label 214, appending the metadata modification 210 to metadata already contained in the temporary metadata label 214, deleting metadata contained in the temporary metadata label 214 (e.g., deleting a field or object), or adding the metadata modification 210 to an empty field or new field contained in the temporary metadata label 214. In the case that the metadata modification 210 is new metadata that is being added to the production data store 206, the temporary metadata label 214 may be populated with the new metadata.

Figure 3:
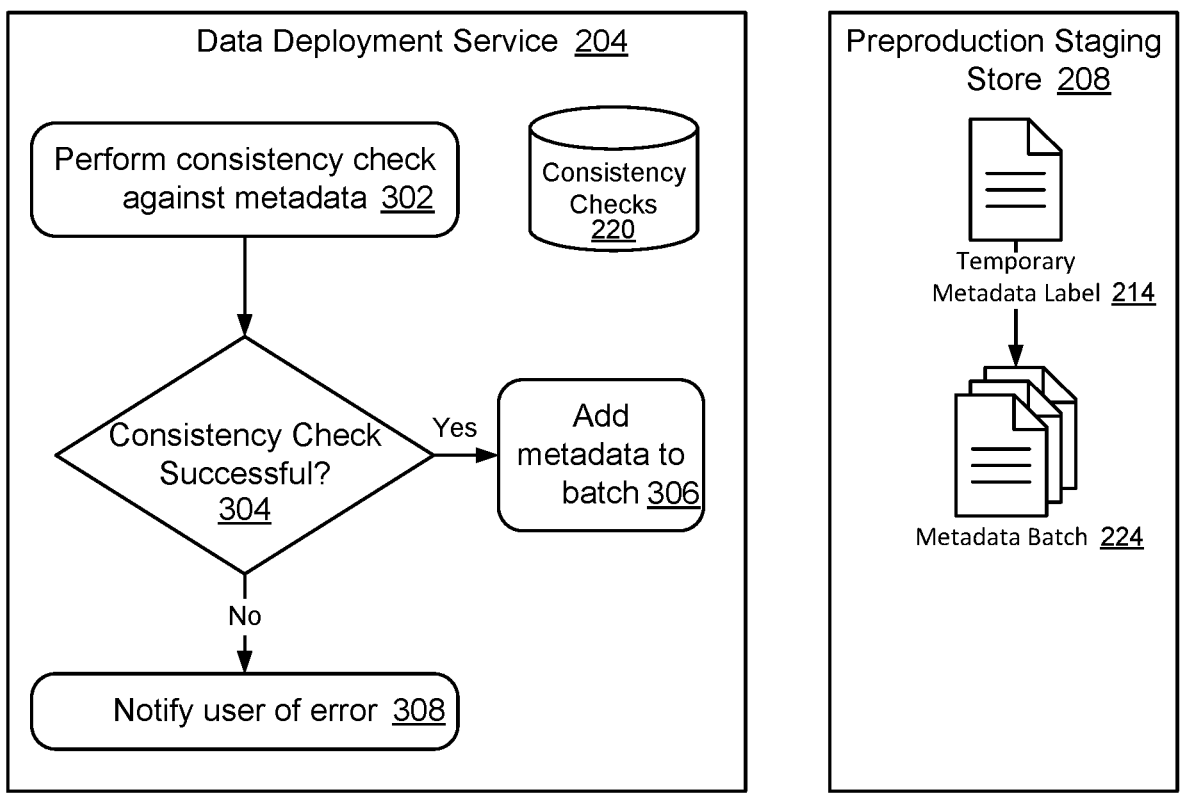
FIG. 3 is a diagram illustrating an example system and method for performing a first consistency check against a metadata modification stored on a preproduction data store.

Referring now to FIG. 3, having generated the temporary metadata label 214 that contains the metadata modification 210, the data deployment service 204, as in block 302, may be configured to execute a consistency check 220 against the metadata contained in the temporary metadata label 214. The consistency check 220 may include one or more metadata specifications used to analyze the metadata contained in the temporary metadata label 214 for data fitness, accuracy, consistency, etc. The data deployment service 204 may be configured to identify a consistency check 220 (e.g., a set of metadata specifications or rules) that is associated with the metadata contained in the temporary metadata label 214. In one example, a consistency check 220 may be associated with a user who submitted a metadata modification, and the consistency check 220 may be identified based on the user (e.g., a user identifier). In another example, a consistency check 220 may be linked to a data store table or an object data container which contains the metadata, and the consistency check 220 may be identified based on the data store table or an object data container (e.g., a table or container identifier). In yet another example, a consistency check 220 may be associated with a particular service that utilizes a type of metadata, and the consistency check 220 may be identified based on the type of metadata (e.g., product metadata) and the service (e.g., a service identifier).

The data deployment service 204 may be capable of concurrently performing consistency checks 220 against a plurality of temporary metadata labels 214. For example, in response to receiving multiple metadata modification requests or receiving a request that includes multiple metadata modifications (e.g., a spreadsheet of metadata modifications), the data deployment service 204 may execute consistency checks 220 against the metadata modifications in parallel using computing resources that can be scaled based on an amount of processing capacity needed to concurrently perform the consistency checks 220 against the metadata modifications. As an example, additional instances of the data deployment service 204, or components of the data deployment service 204, may be launched using computing resources (e.g., servers, computing instances, software containers, etc.) available in a service provider environment to execute consistency checks 220 during times of high demand, and the instances of the data deployment service 204, or data deployment service components may be terminated when demand returns to normal.

In one example, several consistency checks 220 may be executed against a temporary metadata label 214, wherein each consistency check 220 may be associated with a different service or entity that utilizes the metadata, and the consistency checks 220 may be serially executed ("daisy chained") or concurrently executed against the temporary metadata label 214. The failure of one of the consistency checks 220 may prevent a metadata modification from being promoted to the production data store 206. As an illustration, a first consistency check 220 associated with a first service may be used to determine whether metadata complies with a string length specification, and a second consistency check 220 associated with a second service may be used to determine whether the metadata complies with a language type specification (e.g., English, Spanish, etc.). Because both services utilize the metadata, promotion of the metadata modification to the production data store 206 may be contingent upon the success of both consistency checks.

As in block 304, in the case that the consistency check 220 is successful, then as in block 306, the temporary metadata label 214 may be included in a metadata batch 224 (e.g., a batch of temporary metadata labels) cached on the preproduction staging store 208. The metadata batch 224 may include temporary metadata labels 214 that have been successfully validated and are cached on the preproduction staging store 208 pending a second consistency check, which is described below in association with FIG. 4. The metadata batch 224 may remain open to allow for additional temporary metadata labels 214 to be added to the metadata batch 224 while waiting for in progress and pending consistency checks 220 to be completed. Temporary metadata labels 214 may be sequentially added to the metadata batch 224 based on a submission time (i.e., the time that the metadata modification was submitted to the data deployment service 204). After the consistency checks 220 have been performed, the metadata batch 224 may be closed. The metadata batch 224 may potentially include a plurality of metadata modifications submitted by a plurality of users.

In the case that the consistency check is unsuccessful (i.e., the metadata does not comply with the metadata specifications), then as in block 308, a user may be notified that the metadata does not comply with the metadata specifications. In one example, the temporary metadata label 214 may be deleted from the preproduction staging store 208, and a user who requested the metadata modification may be provided with the results of the consistency check 220. The results may specify the outcome of the consistency check 220 and the errors in the metadata modification that caused the consistency check 220 to be unsuccessful. The user may correct the errors in the metadata modification that caused the metadata to fail the consistency check 220, and the user may resubmit the metadata modification to the data deployment service 204.

In another example, a user may be provided with the results of a failed consistency check 220 and receive a request to modify the metadata to comply with the metadata specifications included in the consistency check 220. In response, the user may access the temporary metadata label 214, via a user interface, and make changes to the metadata contained in the temporary metadata label 214, and the user can request that the consistency check 220 be performed again. If successful, the temporary metadata label 214 may be added to the metadata batch 224.

Figure 4:
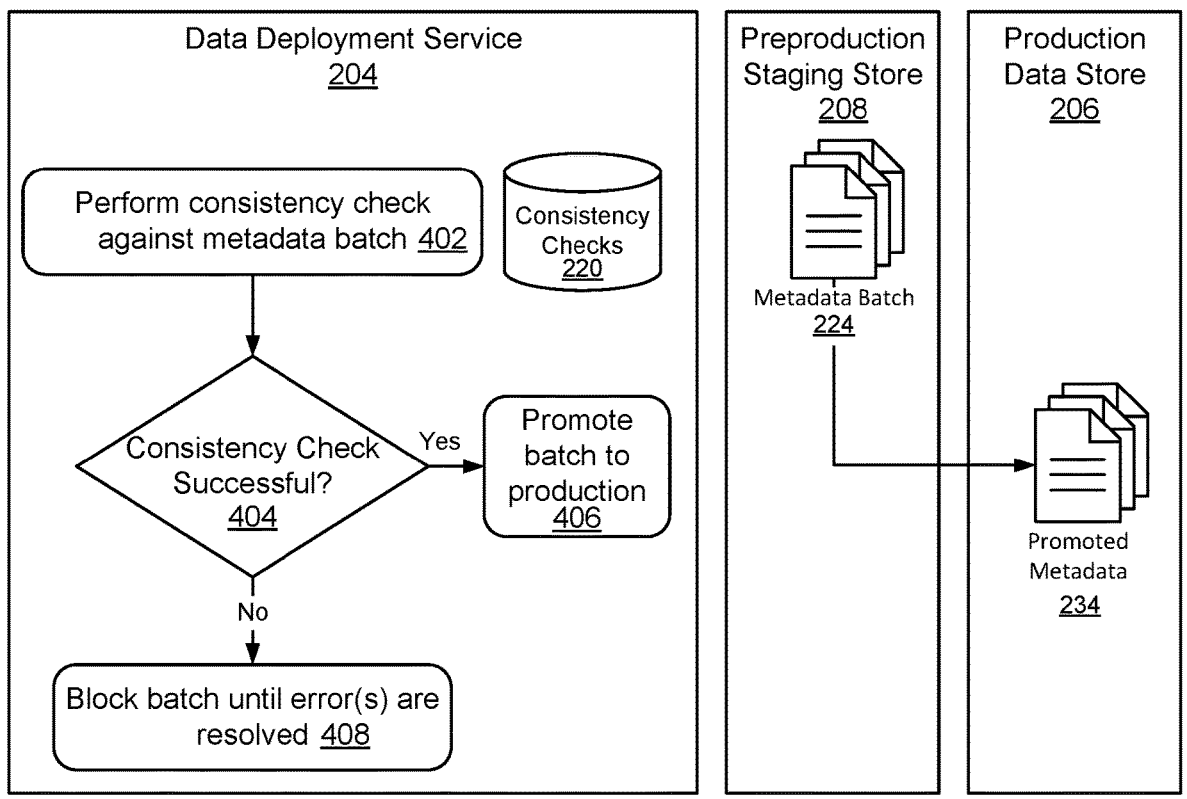
FIG. 4 is a diagram illustrating an example system and method for performing a second consistency check against a metadata batch stored on a preproduction data store.

Referring to FIG. 4, a consistency check 220 may be executed against the metadata batch 224, as in block 402. The consistency check 220 may determine whether metadata modifications contained in the metadata batch 224 continue to comply with metadata specifications. In one example, the consistency check 220 may include the same metadata specifications or rules that were used to validate the temporary metadata labels 214, allowing the temporary metadata labels 214 to be included in the metadata batch 224. In another example, the consistency check 220 may include different or additional metadata specifications that may be used to perform additional validations on metadata modifications included in the metadata batch. More specifically, the second consistency check may determine whether a combination of modifications contained in the metadata batch 224 complies with the metadata specifications included in the first consistency check. For example, when validated individually, metadata modifications contained in the temporary metadata labels 214 may have complied with the metadata specifications included in the first consistency check. However, when combined, the metadata modifications may not comply with the metadata specifications included in the first consistency check. As another example, the consistency check 220 may determine whether changes recently promoted to the production data store 206 conflicts with any metadata modifications included in the metadata batch 224. As an illustration, during a time in which a modification to product metadata (e.g., package weight) is validated and added to a metadata batch 224 that is pending promotion to a production data store 206, a first modification to the product metadata (e.g., package count) may have been promoted to the production data store 206. The first modification to the product metadata (package count) may conflict with the product metadata modification (package weight) contained in the metadata batch 224. The consistency check 220 executed against the metadata batch 224 may be configured to detect the type of conflicts described above that may occur between a pending metadata modification and metadata stored in a production data store 206 that has been previously updated.

As in block 404, if the consistency check is successful, then as in block 406, the metadata modifications included in the metadata batch 224 may be promoted to one or more production data stores 206. More specifically, the promoted metadata 234 may be stored to a data store table or data object in a production data store 206 that contains the metadata. As described earlier, a metadata batch 224 may include a plurality of metadata modifications, and as such, the individual metadata modifications included in the metadata batch 224 may be stored to a production data store 206 that contains metadata corresponding to a metadata modification. After storing the metadata modifications to a production data store 206, the temporary metadata labels 214 may be deleted from the preproduction staging store 208. Also, the metadata modifications included in the metadata batch 224 may be sequentially submitted to the production data store 206 based on a submission time (i.e., the time that the metadata modification was submitted to the data deployment service 204), such that later modifications overwrite earlier modifications of metadata in the metadata batch 224 submitted to the production data store 206.

Returning to block 404, if the consistency check 220 is unsuccessful (e.g., at least one metadata modification included in the metadata batch 224 fails to comply with a metadata specification or rule), then as in block 408, the metadata modifications included in the metadata batch 224 may be blocked from being promoted to a production data store 206 until the errors causing the consistency check failure are resolved. In one example, a user associated with a metadata modification contained in the metadata batch 224 that caused the consistency check 220 to fail may be identified, and the user may be notified (e.g., via a push message, email, user interface, SMS (simple messaging service), etc.) that the metadata modification does not comply with the metadata specifications. The user may be provided with the results of the consistency check 220 and a request to perform a corrective action, such as modifying data in a noncompliant temporary metadata label to comply with dataset specifications or aborting the metadata modification. After performing the corrective action, the metadata batch 224 may be unblocked and the validation process may resume to promote the metadata modifications to the production data store 206.

In one example, a user may modify a noncompliant temporary metadata label 214 cached on the preproduction staging store 208 using a user interface configured to provide user access to the temporary metadata label 214 that allows the user to perform create, read, write, and delete operations. After a noncompliant metadata modification has been corrected, or the metadata modification has been aborted, the remaining metadata modifications included in the metadata batch 224 may be promoted to the production data store 206 and the temporary metadata labels 214 included in the metadata batch 224 may be removed from the preproduction staging store 208.

Figure 5:
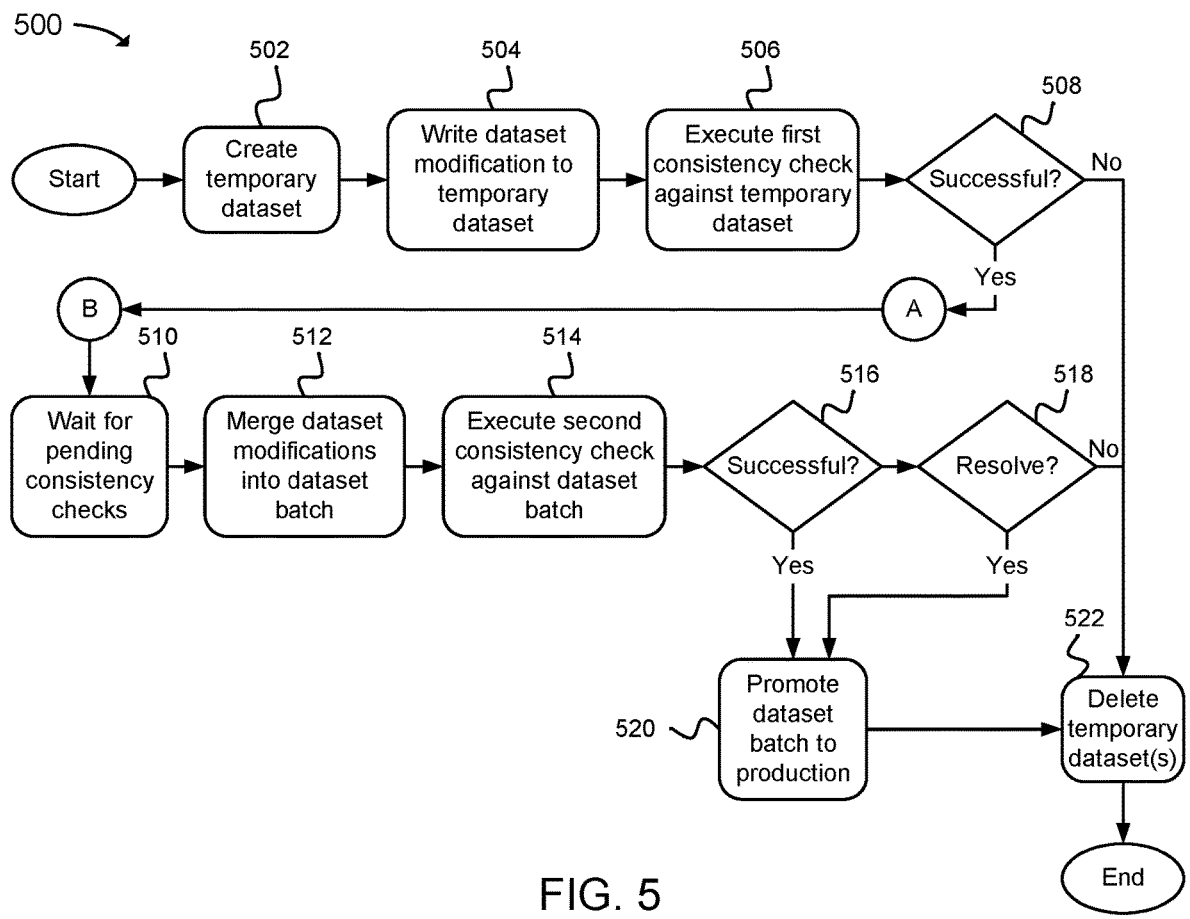
FIG. 5 is a flow diagram that illustrates an example method for promoting a dataset to a production data store.

FIG. 5 is a flow diagram illustrating an example method 500 for promoting a dataset to a production data store. As in block 502, in response to receiving a dataset modification, a temporary dataset may be created in a preproduction environment. The preproduction environment may be used to cache temporary datasets flagged for promotion to a production data store pending one or more successful consistency checks. A dataset may include any type of data, including metadata, which may be stored to a production environment for use by services, programs, clients, and the like. In one example, the temporary dataset may be prepopulated with a production dataset obtained from a production data store that corresponds to the dataset modification.

After creating the temporary dataset in the preproduction environment, as in block 504, the dataset modification may be written to the temporary dataset. In one example, the temporary dataset may comprise a data structure containing a plurality of data fields, and a dataset modification may be written to one or more of the data fields included in a temporary dataset.

As in block 506, a first consistency check may be executed against the temporary dataset to determine whether the dataset modification complies with dataset specifications designed to avoid storing noncompliant data to a production data store. The dataset specifications in a consistency check may include, but are not limited to, specifications for data fitness, accuracy, consistency, as well as other factors. The dataset specifications in a consistency check may be simple data validations (e.g., a unit test for string length) or a set of complex validations (e.g., compounded data rules and dependencies). In one example, dataset specifications included in a consistency check may be user defined. In another example, dataset specifications may be defined based in part on service specifications (e.g., a data format or data type that is compatible with a service's operations). In yet another example, a consistency check may include submitting a temporary dataset to an actual service (or emulated service) that utilizes the data to determine whether a data modification in the temporary dataset is compatible with the service. A consistency check may be associated with a particular data table, data container, datatype, service, process, user, etc. Accordingly, a consistency check may be identified based in part on a relationship of the consistency check to the data in the temporary dataset, a user associated with the data in the temporary dataset, a service configured to use the data the data in the temporary dataset, as well as other factors.

As in block 508, a determination may be made whether the first consistency check was successful. In the case that the first consistency check is successful, then as in block 510, the method 500 identifies whether there are pending consistency checks and waits for the pending consistency checks to complete. For example, as described earlier, consistency checks performed against temporary datasets may be executed in parallel, and the method 500 may wait for these other consistency checks to finish executing before continuing. In one example, the method 500 may determine whether any pending consistency checks exist and wait for the pending consistency checks to complete. In another example, if the first consistency check is successful, the method 500 may determine whether there are any related pending consistency checks (e.g., determine whether the consistency checks are related via datasets, users, services, etc.), and if so, the method 500 may wait for the related consistency checks to finish execution before continuing.

In the case that the first consistency check is unsuccessful, then as in block 522, the temporary dataset may be deleted from the preproduction staging store, and a user that submitted the dataset modification may be notified that the dataset modification does not comply with the dataset specifications. In some examples, a user may be provided with the results of the consistency check and the user may correct errors in the dataset modification identified in the results, and the user may resubmit the modified dataset for validation (e.g., the first consistency check may be re-executed against the dataset modification). For example, the notification to the user may include consistency check results, a status of the dataset modification (e.g., pending correction, aborted and deleted, etc.), and/or options to correct an error in the dataset modification or to cancel the dataset modification.

After pending consistency checks have been completed, as in block 512, validated datasets may be merged into a dataset batch (e.g., the temporary datasets may be flagged for promotion to a production data store), and as in block 514, a second consistency check may be executed against the modified datasets included in the dataset batch. In one example, temporary datasets that have been flagged for promotion to the production data store may be identified and the second consistency check may be executed against the temporary datasets.

The second consistency check may include the same, different, or additional dataset specifications than those which were included in the first consistency check. For example, the second consistency check may be performed to ensure that dataset modifications, when combined with other dataset modifications included in the dataset batch, do not introduce issues that cause the dataset modifications to violate the dataset specifications included in the first consistency check. Additional dataset specifications may be added to the second consistency check to determine whether combined dataset modifications violate the dataset specifications (e.g., whether a combination of dataset modifications adds conflicting data fields to a dataset). As in block 516, in the case that the second consistency check is successful, then a dataset modification in a temporary dataset flagged for promotion to a production data store may be stored to a production data store configured to store the dataset, as in block 520. For example, the modified dataset may be mapped to the production data store and stored to the production data store.

In one example, dataset modifications flagged to be promoted to a production data store may be stored to the production data store in an order in which dataset modifications were received. As such, a later dataset modification (i.e., the last dataset modification to be submitted for validation) may be stored to the production data store overwriting any earlier dataset modifications. After promoting the dataset modifications to one or more production data stores, the temporary datasets included in the dataset batch may be deleted from the preproduction staging store, as in block 522.

In the case that the second consistency check is unsuccessful, then as in block 518, a determination may be made whether an error that caused the second consistency check to fail can be resolved (e.g., updating a dataset modification included in the dataset batch to remove an error or submitting a new dataset modification via a new request that resolves the error). In one example, the dataset batch may be blocked from being promoted to one or more production data stores until an error(s) causing the consistency check failure is resolved. If an error cannot be resolved, the method 500 may abort the dataset modifications, notify the users that submitted the dataset modifications, and delete the temporary datasets from the preproduction staging store. If an error can be resolved, in one example, the users associated with dataset modifications contained in the dataset batch may be identified and notified, and any of the users may correct the error to allow the dataset batch to proceed. In another example, a user associated with the dataset modification containing the error may be notified, and the user may be instructed to either correct the error in the dataset modification (e.g., via a user interface), or cancel the dataset modification. The user may have the option to resubmit the dataset modification, wherein the resubmitted dataset modification may be revalidated using the consistency checks described above. After resolving any errors in the dataset batch, the dataset modifications included in the dataset batch may be promoted to one or more production data stores, as in block 520, and the temporary datasets included in the dataset batch may be deleted from the preproduction staging store, as in block 522.

Figure 6:
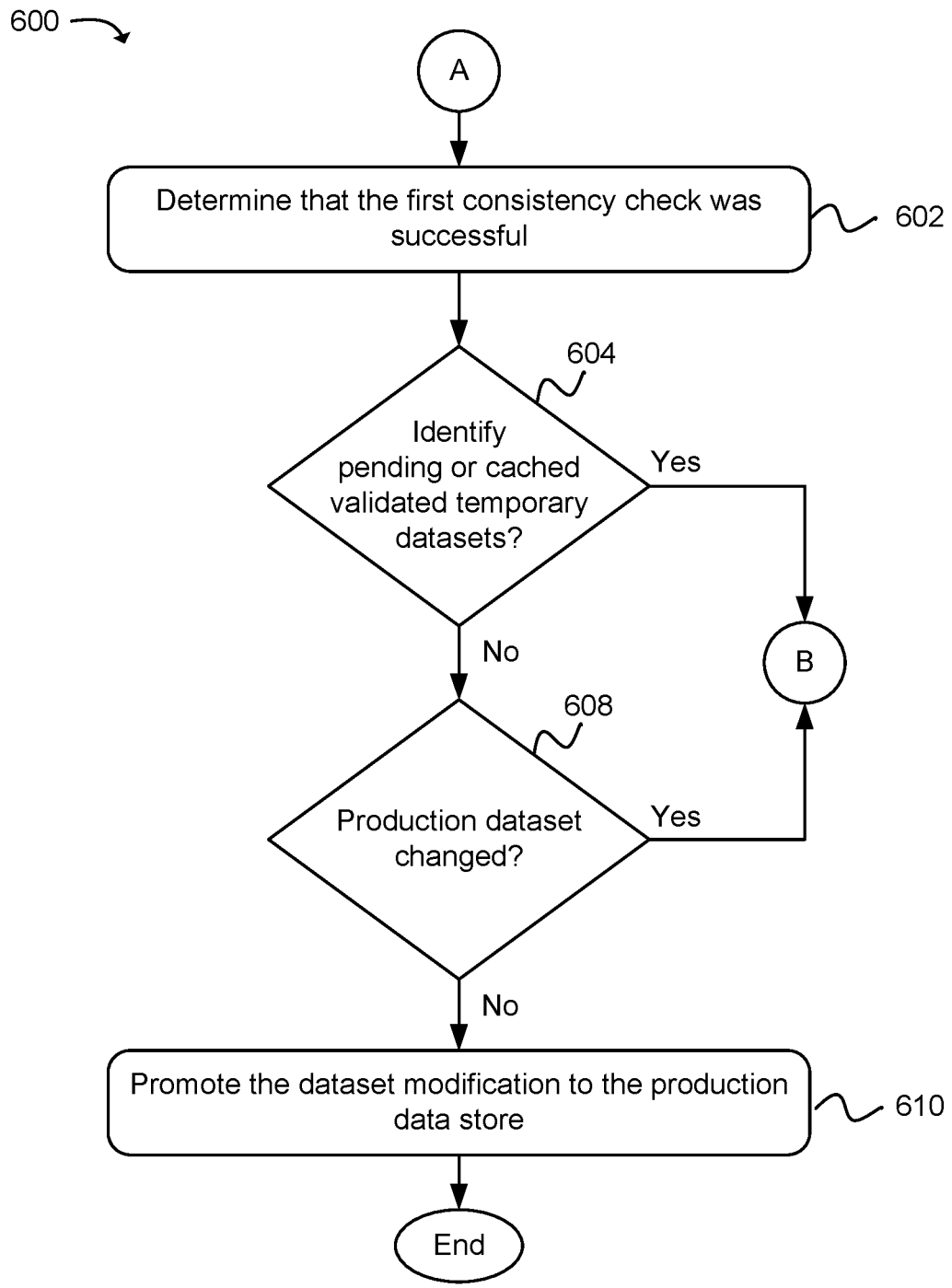
FIG. 6 is a flow diagram illustrating an example method for skipping a second consistency check against a validated temporary dataset cached on a preproduction staging store.

Referring back to block 508, in one example, the method 500 may be "short-circuited" to skip the second consistency check when the conditions described in FIG. 6 are fulfilled.

The method 600 may be used to determine whether or not to execute a second consistency check against the validated temporary dataset cached on the preproduction staging store. The method 600 assumes that no additional checks will be performed on the temporary dataset when the conditions are fulfilled. As shown in block 602, a determination may be made that the dataset modification in the temporary dataset complies with the first consistency check. As in block 604, temporary datasets that are pending a first consistency check and temporary datasets that have been validated by a first consistency check may be identified to determine whether there are additional temporary datasets that can be included in a dataset batch. In the case that pending and/or validated temporary datasets are identified on the preproduction data, then the temporary datasets may be merged into a dataset batch, and a second consistency check may be performed against the dataset batch as described in blocks 512 and 514 in FIG. 5. In some cases, different or additional dataset specifications than those which were included in the first consistency check may be used to perform the second consistency check.

In the case that no pending or validated temporary datasets are identified on the preproduction staging store, then as in block 608, a determination whether a production dataset that corresponds to the modified dataset has been updated since submitting the modified dataset for validation may be made. For example, in some cases, the production dataset may have been modified outside of the two-step data validation process described herein, such as by a database administrator who has direct access to the production data store. In the case that the production dataset has been updated since submitting the dataset modification, then as in block 606, the temporary dataset containing the dataset modification may be merged into a dataset batch, and a second consistency check may be performed against the dataset batch. However, in the case that the production dataset has not been updated, then as in block 610, the modified dataset in the temporary dataset may be promoted to the production data store.

In another example, the preproduction staging store may be a copy or mirror of the production data store. The determination made in block 608 may include a determination whether a preproduction dataset maintained on the preproduction staging store has been updated since submitting the modified dataset for validation. In the case that neither the production dataset contained on the production data store nor the preproduction dataset maintained on the preproduction staging store has been updated since submitting the modified dataset for validation, then as in block 610, the modified dataset in the temporary dataset may be promoted to the production data store. Otherwise, as in block 606, the temporary dataset may be merged into a dataset batch, and a second consistency check may be performed against the dataset batch.

Figure 7:
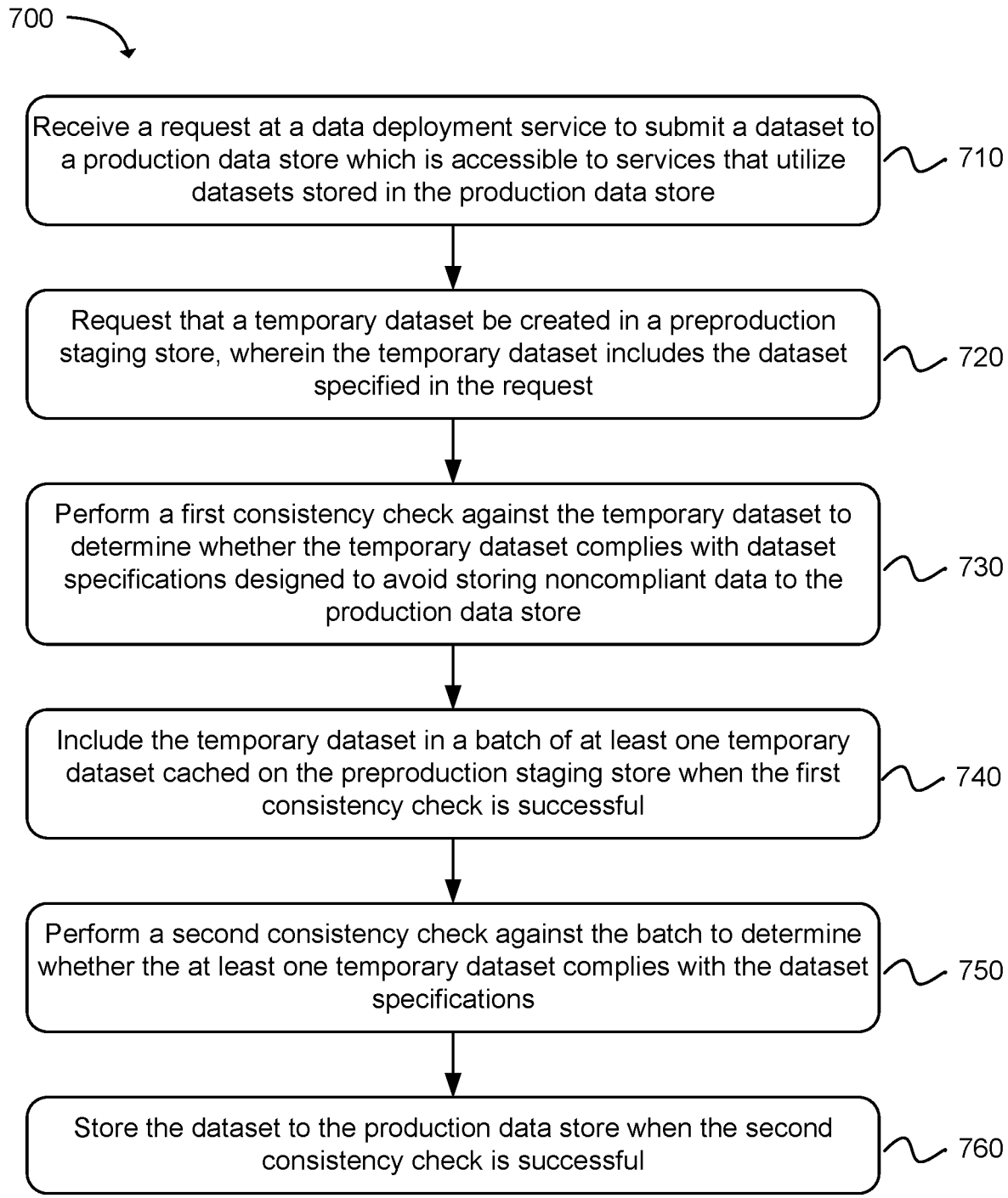
FIG. 7 is a flow diagram that illustrates an example method for staging dataset modifications in a preproduction staging store and validating the dataset modifications prior to promoting the dataset modifications to a production data store.

FIG. 7 is a flow diagram that illustrates an example method 700 for staging dataset modifications in a preproduction staging store and validating the dataset modifications prior to promoting the dataset modifications to a production data store. As in block 710, a request may be received at a data deployment service to submit a dataset to a production data store accessible to services that utilize datasets stored in the production data store. In one example, receiving the request at the data deployment service may further comprise receiving the request via an application programming interface (API) gateway that provides access to the data deployment service. The data deployment service may be hosted in a service provider environment and the data deployment service may comprise independently deployable micro-services that execute on computing resources included in the service provider environment.

In response to receiving the request to submit the dataset to the production data store, the data deployment service, as in block 720, may request that a temporary dataset be created in a preproduction staging store. The temporary dataset may be created to include the dataset specified in the request. In one example, a dataset submitted to the data deployment service may be a dataset modification, and the dataset modification may be written to a temporary dataset on the preproduction staging store that contains an unmodified dataset in order to form a modified dataset.

After the temporary dataset has been created in the preproduction staging store, a first consistency check may be performed against the temporary dataset, as in block 730, to determine whether the temporary dataset complies with dataset specifications designed to avoid storing noncompliant data to the production data store. In one example, a consistency check may be user defined. For example, a user may provide a user defined consistency check to be used by the data deployment service to determine whether datasets submitted by the user to the production data store comply with the user's defined data specifications. In another example, a consistency check may be defined based in part on service specifications for a service that utilizes the datasets stored in the production data store. The service specifications may be used to determine whether a dataset is compatible with the service's operations.

If the first consistency check is unsuccessful, a notification may be sent to a requester that the dataset is noncompliant. The notification may include the results of the consistency check. Thereafter, in one example, the temporary dataset may be deleted from the preproduction staging store. In another example, a notification may be sent to the requester instructing the requester to modify the dataset to comply with the dataset specifications and resubmit the dataset for verification. If the first consistency check is successful, the temporary dataset may be included in a batch of one or more temporary datasets cached on the preproduction staging store, as in block 740. For example, the temporary dataset may be flagged to be promoted to the production data store, and temporary datasets flagged for promotion may be included in a dataset batch.

As in block 750, a second consistency check may be performed against the dataset batch to determine whether the datasets in the temporary datasets comply with the dataset specifications. If the second consistency check is unsuccessful, a noncompliant dataset included in the batch may be identified, and a notification may be sent to any or all requesters associated with the dataset batch containing the noncompliant dataset. The notification may inform the requesters that the dataset is noncompliant and request that that the noncompliant dataset be modified to comply with the dataset specifications or delete the temporary dataset from the preproduction staging store. In another example, the notification may be sent to any user associated with a dataset included in the dataset batch allowing any interested user to correct an error contained in the dataset batch. As an illustration, when combined into a dataset batch, conflicting datasets may cause the second consistency check to fail, causing the dataset batch to be blocked. Users associated with the conflicting datasets may not be known. As such, a notification may be sent to each user associated with the dataset batch, and any of the users may correct the error to allow the dataset batch to continue processing. If the second consistency check is successful, then as in block 760, the datasets included in the dataset batch may be stored to the production data store, and the temporary datasets included in the dataset batch may be deleted from the preproduction staging store.

After promoting the datasets to the production data store, notifications indicating that the datasets have been promoted to the production data store may be sent to users associated with the datasets. For example, the two-step data validation process described herein may take an arbitrary amount of time to complete, and as such, users may not have an accurate expectation for when the process will be complete. Therefore, a notification may be sent to the users to let the users know that the data validation process has finished.

Figure 8:
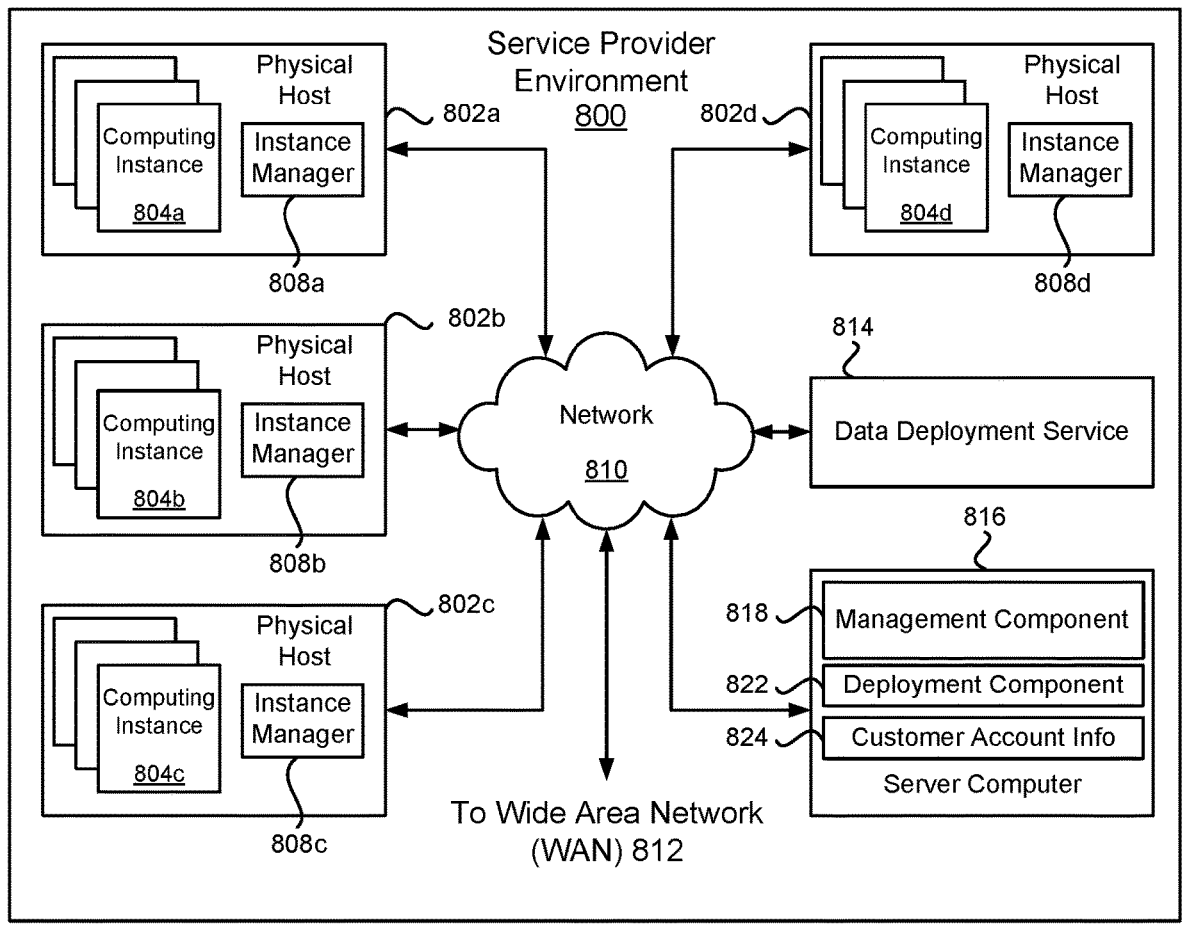
FIG. 8 is a block diagram that illustrates various components of a service provider environment which hosts a data deployment service.

FIG. 8 is a block diagram illustrating an example service provider environment 800 that may be used to execute and manage a number of computing instances 804*a-d*. In particular, the service provider environment 800 depicted illustrates one environment in which the technology described herein may be used. The service provider environment 800 may include various virtualized service resources that may be used, for instance, to host computing instances 804*a-d*, which may be used to execute the components of the system described in FIG. 1.

The service provider environment 800 may be capable of delivery of computing, storage and networking capacity as a software service. In one example, the service provider environment 800 may be established for an organization by or on behalf of the organization. That is, the service provider environment 800 may offer a "private cloud environment." In another example, the service provider environment 800 may support a multi-tenant environment, wherein a plurality of customers may operate independently (i.e., a public cloud environment). Generally speaking, the service provider environment 800 may provide the following models: Infrastructure as a Service ("IaaS"), network-accessible system as a service, and/or Software as a Service ("SaaS"). Other models may be provided. For the IaaS model, the service provider environment 800 may offer computers as physical or virtual machines and other resources. The virtual machines may be run as guests by a hypervisor, as described further below. The network-accessible system as a service model delivers a computing system that may include an operating system, programming language execution environment, database, and web server.

Application developers may develop and run software solutions in the service provider environment 800 without incurring the cost of buying and managing the underlying hardware and software. The SaaS model allows installation and operation of application software in the service provider environment 800. End customers may access the service provider environment 800 using networked client devices, such as desktop computers, laptops, tablets, smartphones, etc. running web browsers or other lightweight client applications, for example. Those familiar with the art will recognize that the service provider environment 800 may be described as a "cloud" environment.

The particularly illustrated service provider environment 800 may include a plurality of server computers 802*a-d*. While four server computers are shown, any number may be used, and large data centers may include thousands of server computers. The service provider environment 800 may provide computing resources for executing computing instances 804*a-d*. Computing instances 804*a-d* may, for example, be virtual machines. A virtual machine may be an instance of a software implementation of a machine (i.e. a computer) that executes applications like a physical machine. In the example of a virtual machine, each of the server computers 802a-d may be configured to execute an instance manager 808a-d capable of executing the instances. The instance manager 808a-d may be a hypervisor, virtual machine monitor (VMM), or another type of program configured to enable the execution of multiple computing instances 804a-d on a single server. Additionally, each of the computing instances 804a-d may be configured to execute one or more applications, software containers, micro-services, or types of software components.

One or more server computers 814 and 816 may be reserved to execute software components for managing the operation of the service provider environment 800 and the computing instances 804a-d. In one example, a server computer 814 may execute the data deployment service described earlier. In another example, the data deployment service may be hosted on one or more computing instances 804a-d. In yet another example, the data deployment service may be executed using micro-services that execute linked functions in a workflow where the output of one service may be provided as input to a second service.

A server computer 816 may execute a management component 818. A customer may access the management component 818 to configure various aspects of the operation of the computing instances 804a-d purchased by a customer. For example, the customer may setup computing instances 804a-d and make changes to the configuration of the computing instances 804a-d.

A deployment component 822 may be used to assist customers in the deployment of computing instances 804a-d. The deployment component 822 may have access to account information associated with the computing instances 804a-d, such as the name of an owner of the account, credit card information, country of the owner, etc. The deployment component 822 may receive a configuration from a customer that includes data describing how computing instances 804a-d may be configured. For example, the configuration may include an operating system, provide one or more applications to be installed in computing instances 804a-d, provide scripts and/or other types of code to be executed for configuring computing instances 804a-d, provide cache logic specifying how an application cache should be prepared, and other types of information. The deployment component 822 may utilize the customer-provided configuration and cache logic to configure, prime, and launch computing instances 804a-d. The configuration, cache logic, and other information may be specified by a customer accessing the management component 818 or by providing this information directly to the deployment component 822.

Customer account information 824 may include any desired information associated with a customer of the multi-tenant environment. For example, the customer account information may include a unique identifier for a customer, a customer address, billing information, licensing information, customization parameters for launching instances, scheduling information, etc. As described above, the customer account information 824 may also include security information used in encryption of asynchronous responses to API requests. By "asynchronous" it is meant that the API response may be made at any time after the initial request and with a different network connection.

A network 810 may be utilized to interconnect the service provider environment 800 and the server computers 802a-d, 816. The network 810 may be a local area network (LAN) and may be connected to a Wide Area Network (WAN) 812 or the Internet, so that end customers may access the service provider environment 800. The network topology illustrated in FIG. 8 has been simplified, many more networks and networking devices may be utilized to interconnect the various computing systems disclosed herein.

Figure 9:
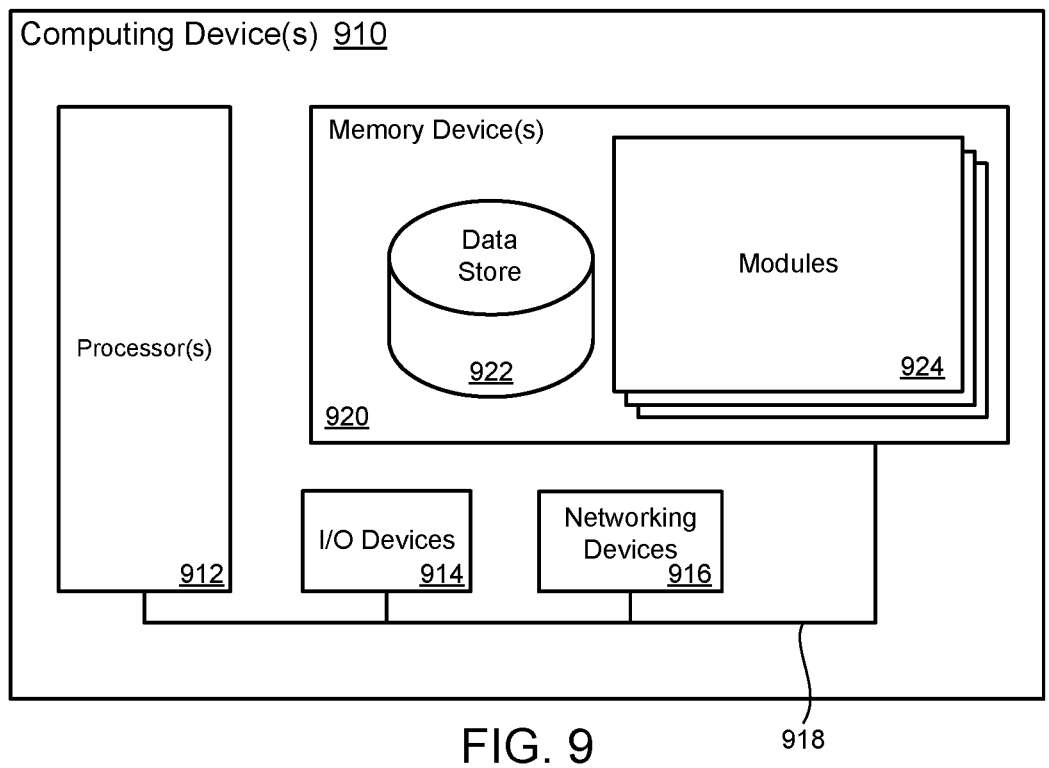
FIG. 9 is block diagram illustrating an example of a computing device that may be used to execute a method for validating datasets in preproduction environment before promoting the datasets to a production environment.

FIG. 9 illustrates a computing device 910 on which modules of this technology may execute. A computing device 910 is illustrated on which a high-level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. In one example, the modules may include data deployment modules used to execute a data deployment service, as well as other modules. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high-level programming languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid-state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local communication interface 918 may be used as a network to facilitate communication between any of the multiple processors and multiple memories. The local communication interface 918 may use additional systems designed for coordinating communication such as load balancing, bulk data transfer and similar systems.

While the flowcharts presented for this technology may imply a specific order of execution, the order of execution may differ from what is illustrated. For example, the order of two or more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system comprising:
   at least one processor;
   a memory device including instructions that, when executed by the at least one processor, cause the system to:
   receive a request to modify metadata associated with an item in an electronic catalog, wherein the metadata is stored in a production metadata store which is available to a plurality of services hosted in a service provider environment;
   generate a temporary metadata label in a preproduction staging store to contain the metadata from the production metadata store and a metadata modification included in the request;
   perform a first consistency check against the temporary metadata label to determine whether the temporary metadata label complies with metadata specifications;
   write the temporary metadata label to a batch of temporary metadata labels cached on the preproduction staging store when the first consistency check is successful;
   write a second temporary metadata label to the batch of temporary metadata labels, wherein the second temporary metadata label has been validated using the first consistency check;
   perform a second consistency check against the batch of temporary metadata labels to determine whether the batch of temporary metadata labels comply with the metadata specifications; and
   store metadata modifications contained in the batch of temporary metadata labels to the production metadata store when the second consistency check is successful.

2. The system as in claim 1, wherein the system further comprises a user interface to provide the metadata retrieved from the production metadata store to a user, and to receive the metadata modification from the user that is to be written to the temporary metadata label.

3. The system as in claim 1, wherein the memory device includes instructions that, when executed by the at least one processor, cause the system to further:
determine that the first consistency check is unsuccessful;
delete the temporary metadata label from the preproduction staging store; and
notify a requester that the metadata modification does not comply with the metadata specifications.

4. The system as in claim 1, wherein the memory device includes instructions that, when executed by the at least one processor, cause the system to further:
determine that the second consistency check is unsuccessful; and
notify at least one requester that the at least one metadata modification contained in the batch does not comply with the metadata specifications and request that corrective action be performed, wherein modifications to the metadata are blocked pending performance of the corrective action.

5. A computer implemented method, comprising:
receiving a request at a data deployment service to submit a dataset to a production data store which is accessible to services that utilize datasets stored in the production data store;
requesting that a temporary dataset be created in a preproduction staging store, wherein the temporary dataset includes the dataset specified in the request;
performing a first consistency check against the temporary dataset to determine whether the temporary dataset complies with dataset specifications defined to avoid storing noncompliant data to the production data store;
including the temporary dataset in a batch of at least one temporary dataset cached on the preproduction staging store when the first consistency check is successful;
performing a second consistency check against the at least one temporary dataset included in the batch to determine whether the at least one temporary dataset complies with the dataset specifications; and
storing the dataset to the production data store when the second consistency check is successful.

6. The method as in claim 5, further comprising receiving user defined dataset specifications to be used by the data deployment service to perform a consistency check.

7. The method as in claim 5, wherein a consistency check that is used to determine whether the temporary dataset complies with the dataset specifications is defined based in part on service specifications for a service that utilizes the datasets stored in the production data store.

8. The method as in claim 5, further comprising:
receiving a modification to the dataset; and
writing the modification to the temporary dataset to form a modified dataset that is stored to the production data store when the second consistency check is successful.

9. The method as in claim 8, wherein receiving the modification to the dataset further comprises determining whether the modification to the dataset conflicts with an earlier submitted dataset modification cached on the preproduction staging store.

10. The method as in claim 5, wherein receiving the request at the data deployment service further comprises receiving the request via an application programming interface (API) that provides access to the data deployment service, and
wherein the data deployment service is hosted in a service provider environment, and the data deployment service is executed using independently deployable microservices that execute on computing resources included in the service provider environment.

11. The method as in claim 5, wherein a data store service hosted in a service provider environment manages the production data store and the preproduction staging store, and the data deployment service is a component of the data store service.

12. The method as in claim 5, wherein performing the first consistency check against the temporary dataset further comprises performing the first consistency check concurrently against multiple temporary datasets upon receiving multiple dataset modifications.

13. The method as in claim 5, further comprising sending a notification to a requester that the dataset is noncompliant when the first consistency check is unsuccessful, wherein the notification includes results of the first consistency check.

14. The method as in claim 13, wherein the notification to the requester includes a request that the dataset be modified to comply with the dataset specifications.

15. The method as in claim 5, further comprising:
determining that the second consistency check is unsuccessful;
identifying a noncompliant temporary dataset included in the batch; and
sending a notification to a requester that includes a request that the noncompliant temporary dataset be modified to comply with the dataset specifications.

16. The method as in claim 5, wherein storing the dataset to the production data store further comprises deleting the temporary dataset from the preproduction staging store.

17. A non-transitory machine readable storage medium including instructions embodied thereon, the instructions when executed by one or more processors:
receive a dataset modification to a dataset stored in a production data store configured to provide the dataset to services to utilize the dataset;
create a temporary dataset in a preproduction staging store, wherein the temporary dataset is created using the dataset retrieved from the production data store;
write the dataset modification to the temporary dataset to form a modified dataset;
perform a first consistency check against the temporary dataset to determine whether the modified dataset complies with service specifications for a service configured to utilize the dataset;
flag the temporary dataset to be promoted to the production data store when the first consistency check is successful;
identify temporary datasets flagged to be promoted to the production data store, wherein a second consistency check is performed against the temporary datasets when more than one temporary dataset flagged for promotion to the production data store is identified; and
store the modified dataset included in the temporary dataset flagged to be promoted to the production data store.

18. The non-transitory machine readable storage medium in claim 17, further comprising instructions that when executed by the one or more processors cause the one or more processors to:
determine that, other than the temporary dataset flagged to be promoted to the production data store, no other temporary datasets are flagged to be promoted to the production data store;

determine that the dataset stored on the production data store has not been modified since receiving the dataset modification to the dataset; and skip performing the second consistency check against the temporary dataset flagged to be promoted to the production data store.

19. The non-transitory machine readable storage medium in claim 17, further comprising instructions that when executed by the one or more processors cause the one or more processors to send a notification to a requester when the first consistency check or the second consistency check is unsuccessful, wherein the notification includes: consistency check results, a status of the dataset modification, and options to correct an error in the dataset modification or cancel the dataset modification.

20. The non-transitory machine readable storage medium in claim 17, wherein the temporary datasets flagged to be promoted to the production data store are stored to the production data store in an order in which dataset modifications were received.

* * * * *